(12) United States Patent
Hong et al.

(10) Patent No.: US 7,415,588 B2
(45) Date of Patent: Aug. 19, 2008

(54) ELECTRONIC DEVICE WITH AN AUTOMATIC BACKUP FUNCTION

(75) Inventors: Chung-Jen Hong, Taipei (TW); Kuo-Ping Lu, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 244 days.

(21) Appl. No.: 11/426,001

(22) Filed: Jun. 22, 2006

(65) Prior Publication Data
US 2007/0010986 A1   Jan. 11, 2007

(30) Foreign Application Priority Data
Jul. 11, 2005   (TW) ............................... 94123327 A

(51) Int. Cl.
*G06F 12/06* (2006.01)
(52) U.S. Cl. ...................... 711/162; 711/114
(58) Field of Classification Search ................ 711/162, 711/161, 165, 152, 143, 114, 112; 707/6, 707/204, 101; 709/217
See application file for complete search history.

(56) References Cited

U.S. PATENT DOCUMENTS

2005/0050117 A1* 3/2005 Seo et al. .................... 707/204
2005/0052548 A1* 3/2005 Delaney .................. 348/231.2
2007/0174675 A1* 7/2007 Lee et al. ......................... 714/6

FOREIGN PATENT DOCUMENTS

KR     2001100592     * 11/2001

OTHER PUBLICATIONS

"A distributed Hierachical Storage Manager for a Video-on-Demand System", Storage and Retrieval of Image and Video Databases II, IS&T/SPIE Symposium on Elec. Imaging Sci. & Tech., San Jose, CA, Feb. 1994. (pp. 185-197).*
"High speed file transfer, point to point and multipoint, using satellite links" by Valet Isabelle Data Networks with Satellites Working Conference of the Joint GI/NTG Working Group, pp. 178-186, Springer-Verlag, 1983.*

* cited by examiner

*Primary Examiner*—Pierre-Michel Bataille
(74) *Attorney, Agent, or Firm*—Jianq Chyun IP Office

(57) ABSTRACT

An electronic device with an automatic backup function for handling a first data stream is provided. The electronic device comprises a main board, a data-sync chipset, a first storage unit, a wireless transmission module, and a second storage unit. Here, the data-sync chipset receives the first data stream and provides a second data stream to each of the first and second storage units so that the same file or all the files in a data-sync data folder can be stored in both the first and second storage units for the purpose of auto-backup. In addition, the wireless transmission module can transmit the first file to the second storage unit by means of wireless transmission. Accordingly, the second storage unit can be used as a mobile hard disk for wireless transmission.

11 Claims, 6 Drawing Sheets

ELECTRONIC DEVICE WITH AN AUTOMATIC BACKUP FUNCTION

CROSS-REFERENCE TO RELATED APPLICATION

This application claims the priority benefit of Taiwan application serial no. 94123327, filed on Jul. 11, 2005. All disclosure of the Taiwan application is incorporated herein by reference.

BACKGROUND OF THE INVENTION

1. Field of the Invention

The present invention relates to an electronic device, and more particularly, to an electronic device with an automatic backup or an overwrite file function.

2. Description of the Related Art

The applied techniques to the computer and data processing are continuously changed. In addition to use the internal hard drive to store a great amount of data, more data storage devices connected to the computer or server by means of external transmission are used for data back-up and storage now. The common data storage devices, for example, include the memory card, the flash portable disk, the recordable/rewritable optical disc, the large capacity micro drive, or the disk array system.

Using the external hard drive as an example, a user stores a data file in an external hard drive for the convenience of carrying, and the external hard drive can be used as a data transmission facility between two computers. For instance, the incomplete work can be saved as a file into the external hard drive in the office, and the external hard drive can be plugged into the home computer to continue the office work at home. Meanwhile, the system regards the external hard drive as a data storage unit and read the data file from the external hard drive in order to revise the data. In order to avoid the loss and damage of important data, the user usually backs up more than one copy of the file with important data into the internal hard drive of the computer, and the data file will be named the same for easy recognition. However, the above-mentioned backup operation is manually operated, which is inconvenient to the user and error prone. Consequently, the files cannot be easily shared.

Figure 1:
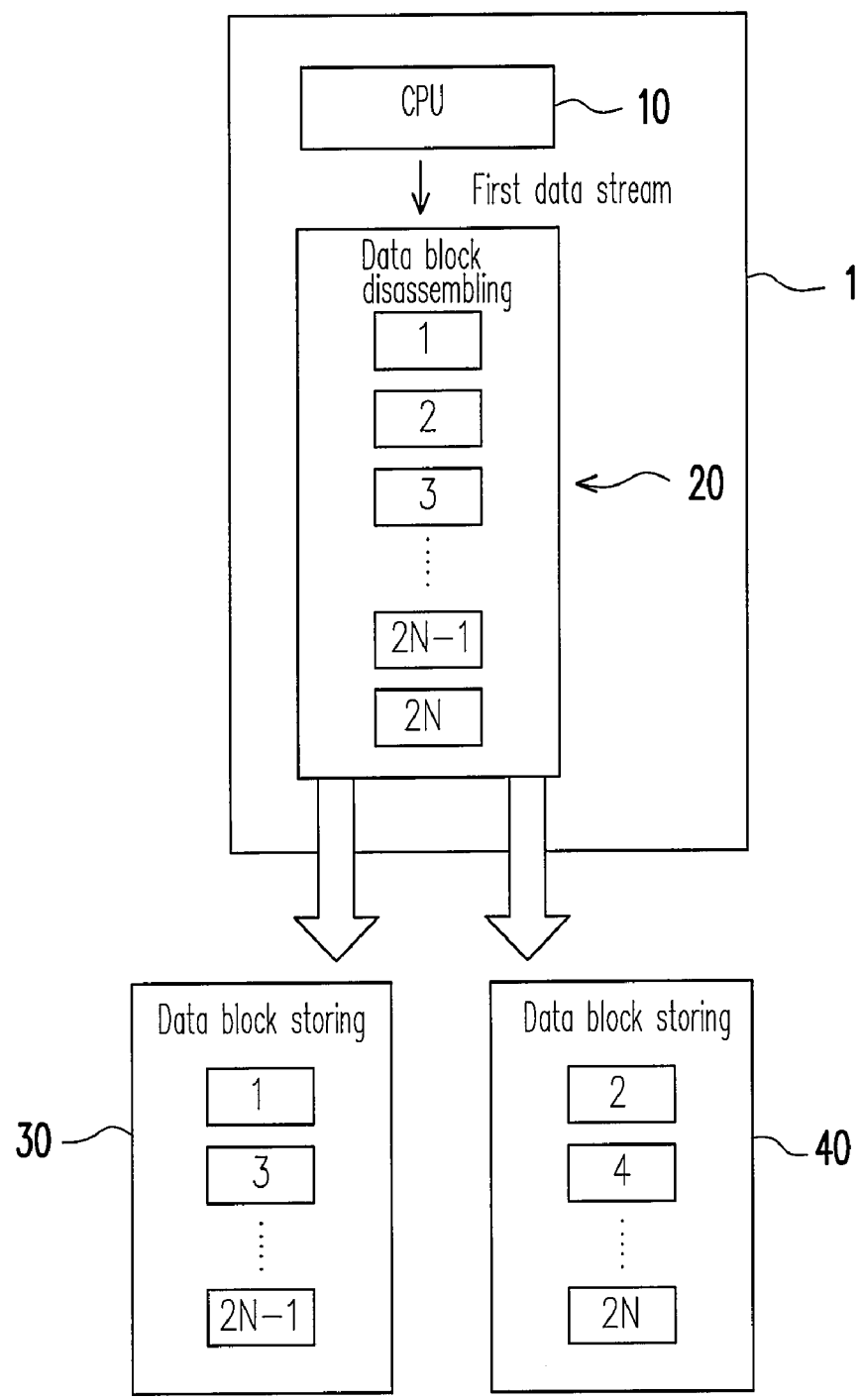

FIG. 1 schematically shows a flow diagram illustrating the operating principle of a conventional disk array system. The main board 1 is exemplified herein. When a first data stream is provided to a disk array controller 20 by a CPU (Central Processing Unit) 10, the first data stream is disassembled into a plurality of data blocks 1~2N and stored into the hard disks of two disk drives 30 and 40. When the disk array controller 20 is configured to operate in the RAID 0 mode, the data blocks 1~2N will be equally disassembled into two portions and then respectively written into the hard disks of the two disk drives 30 and 40. Since these two disk drives 30 and 40 synchronously perform the read or write operation on the data blocks 1~2N, the speed of data backup can be doubled.

Figure 2:
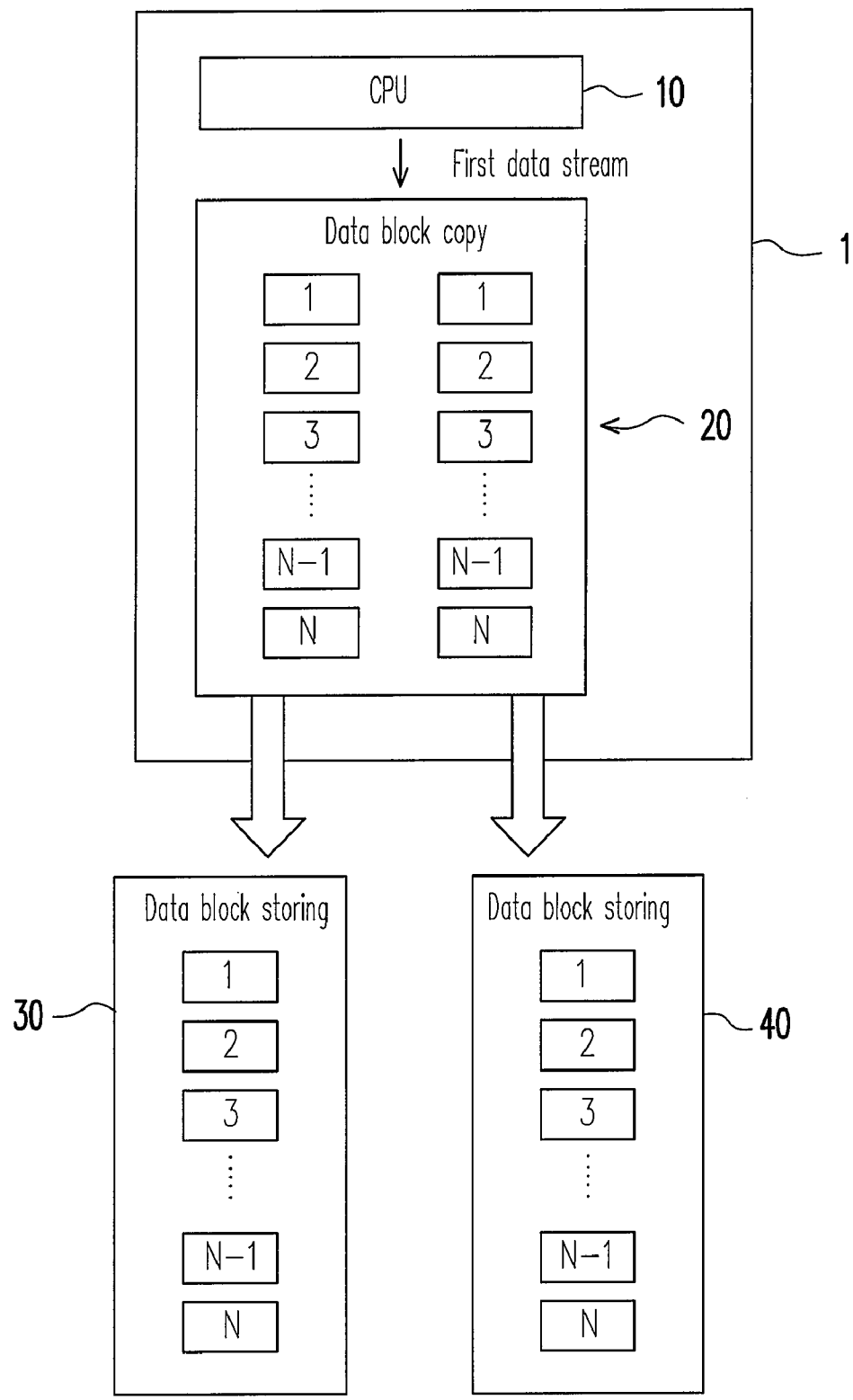

FIG. 2 schematically shows a flow diagram illustrating the operating principle of another conventional disk array system. When the disk array controller 1 is configured to operate in the RAID 1 mode, two copies of the data blocks 1~N are automatically made and simultaneously written into the hard disks of the two hard drives 30 and 40. Since both disk drives 30 and 40 store the same data blocks 1~N, once one of the disk drive units is malfunctioned, the same data blocks can be read from the other disk drive, such that the data loss is avoided. Accordingly, the RAID 1 mode is also known as the disk mirroring mode.

SUMMARY OF THE INVENTION

Therefore, the object of the present invention is to provide an electronic device with an automatic backup function. With such a device, the user-modified or default file can be automatically copied to the external data storage unit so as to raise file-sharing capability and to facilitate its users.

The present invention provides an electronic device with an automatic backup function to deal with at least a first data stream. The electronic device comprises a main board, a data-sync chipset, a first storage unit, a wireless transmission module, and a second storage unit. The data-sync chipset is disposed on the main board to receive the first data stream, and the data-sync chipset provides at least a second data stream. The first storage unit is electrically coupled to a first terminal of the data-sync chipset, and the second data stream is stored as a first file in the first storage unit. In addition, the wireless transmission module disposed on the main board is electrically coupled to a second terminal of the data-sync chipset. Both data-sync chipset and the wireless transmission module are controlled and driven by a driver program. Moreover, the wireless transmission module is connected to the second storage unit by means of wireless transmission. The second data stream is stored as a second file in the second storage unit, and the first file is substantially equal to the second file. When the first file is modified to a third file but the second file is not modified, the data-sync chip copies the third file to the second storage unit and overwrites the second file therein.

In accordance with the first and second embodiments of the present invention, the above-mentioned first data stream is copied to the first and the second storage units by means of mapping.

In accordance with the first embodiment of the present invention, the above-mentioned data-sync chipset is, for example, a RAID controller, and the RAID controller is configured to operate in a RAID 1 mode (i.e. the disk mirroring mode).

In accordance with the first embodiment of the present invention, the above-mentioned data-sync chipset and the driver program determine, for example, whether the first file has been modified according to a file modification time.

In accordance with the second embodiment of the present invention, the above-mentioned driver program further comprises at least a function option, wherein the function option defines a first data folder of the first storage unit as a sync data folder.

In accordance with the second embodiment of the present invention, the above-mentioned data-sync chipset and the driver program copy the first data folder of the first storage unit to the second storage unit and overwrites the data therein during a predetermined period of time.

In accordance with the first and second embodiments of the present invention, the above-mentioned electronic device further comprises a case. The first storage unit is an internal hard drive fixed on the case. The second storage unit is disposed outside of the case, and the second storage unit is a portable external hard drive supporting the wireless data transmission.

In accordance with the first and second embodiments of the present invention, the above-mentioned driver program and the data-sync chipset instruct that a first transmission rate of the first storage unit must be equal to a second transmission rate of the second storage unit.

In accordance with the first and second embodiments of the present invention, the above-mentioned means of wireless transmission is, for example, using an IEEE 802.11b or an IEEE 802.11g WLAN (Wireless Local Area Network) transmission.

In the present invention, the data-sync chipset copies the modified first file (i.e. the third file) to the second storage unit and overwrites the second file therein. Accordingly, same files can be stored in two separate storage units so as to raise file-sharing capability and to facilitate its users. In addition, if a sync data folder is configured in the first storage unit, the data-sync chipset can simultaneously write all of the files to the second storage from the sync data folder unit by means of RAID 1 during a predetermined period of time, such that the loss and damage of data are both avoided, and the data security is improved.

BRIEF DESCRIPTION DRAWINGS

The accompanying drawings are included to provide a further understanding of the invention, and are incorporated in and constitute a part of this specification. The drawings illustrate embodiments of the invention, and together with the description, serve to explain the principles of the invention.

FIG. 1 schematically shows a flow diagram illustrating the operating principle of a conventional disk array system.

FIG. 2 schematically shows a flow diagram illustrating the operating principle of another conventional disk array system.

Figure 3:
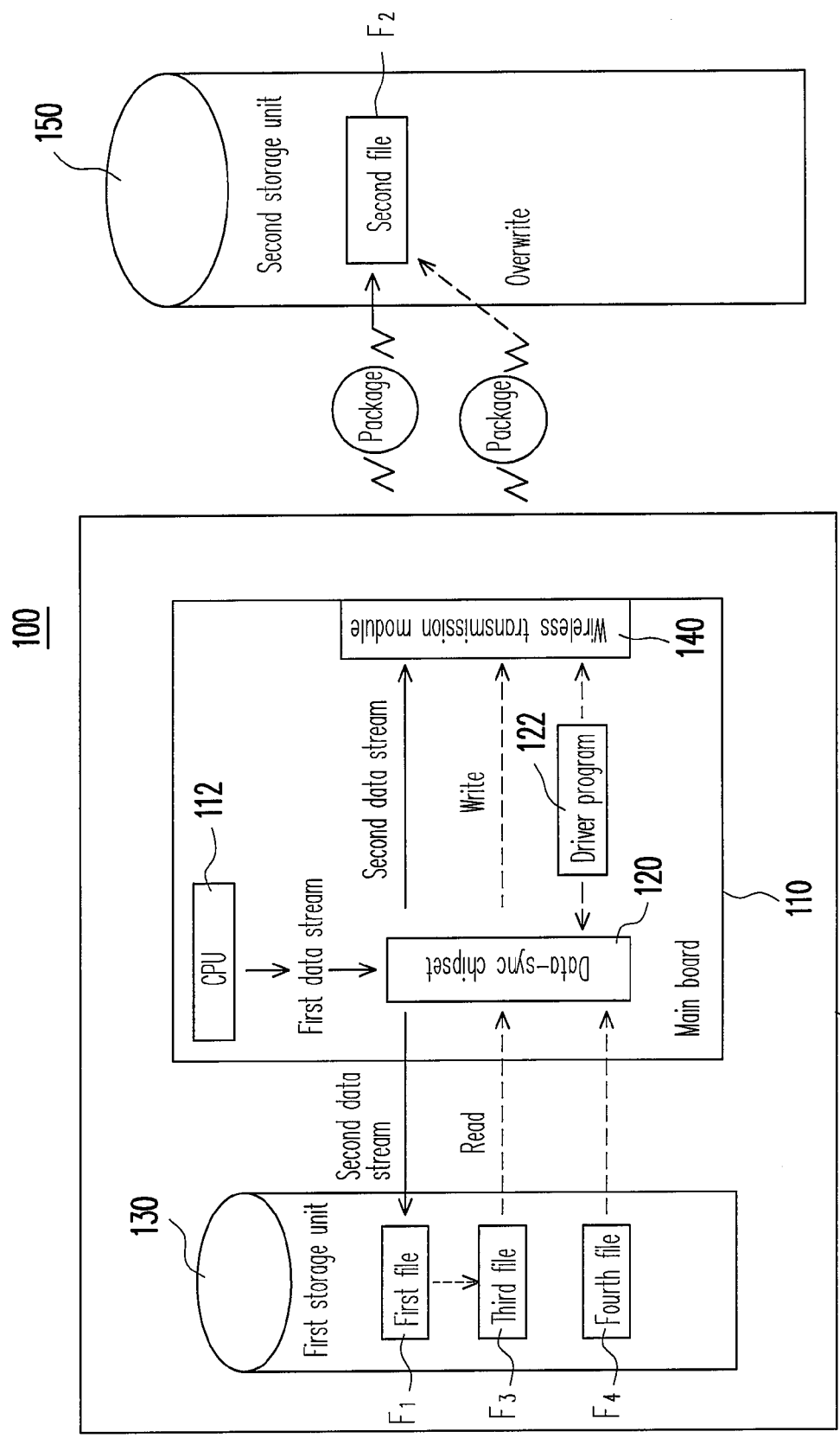

FIG. 3 schematically shows a block diagram of an electronic device with the automatic backup function according to a first embodiment of the present invention.

Figure 4:
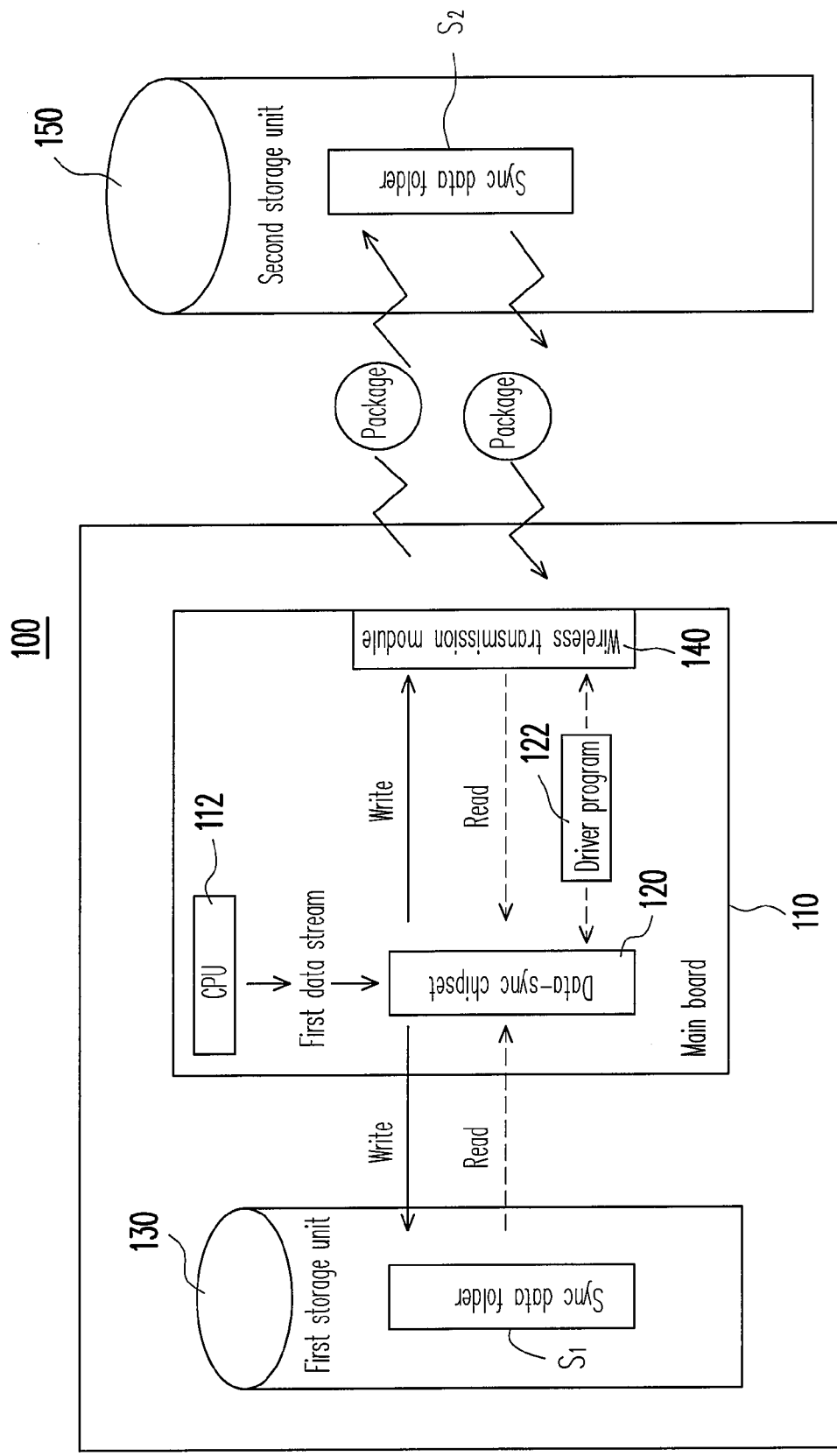

FIG. 4 schematically shows a block diagram of an electronic device with the automatic backup function according to a second embodiment of the present invention.

Figure 5:
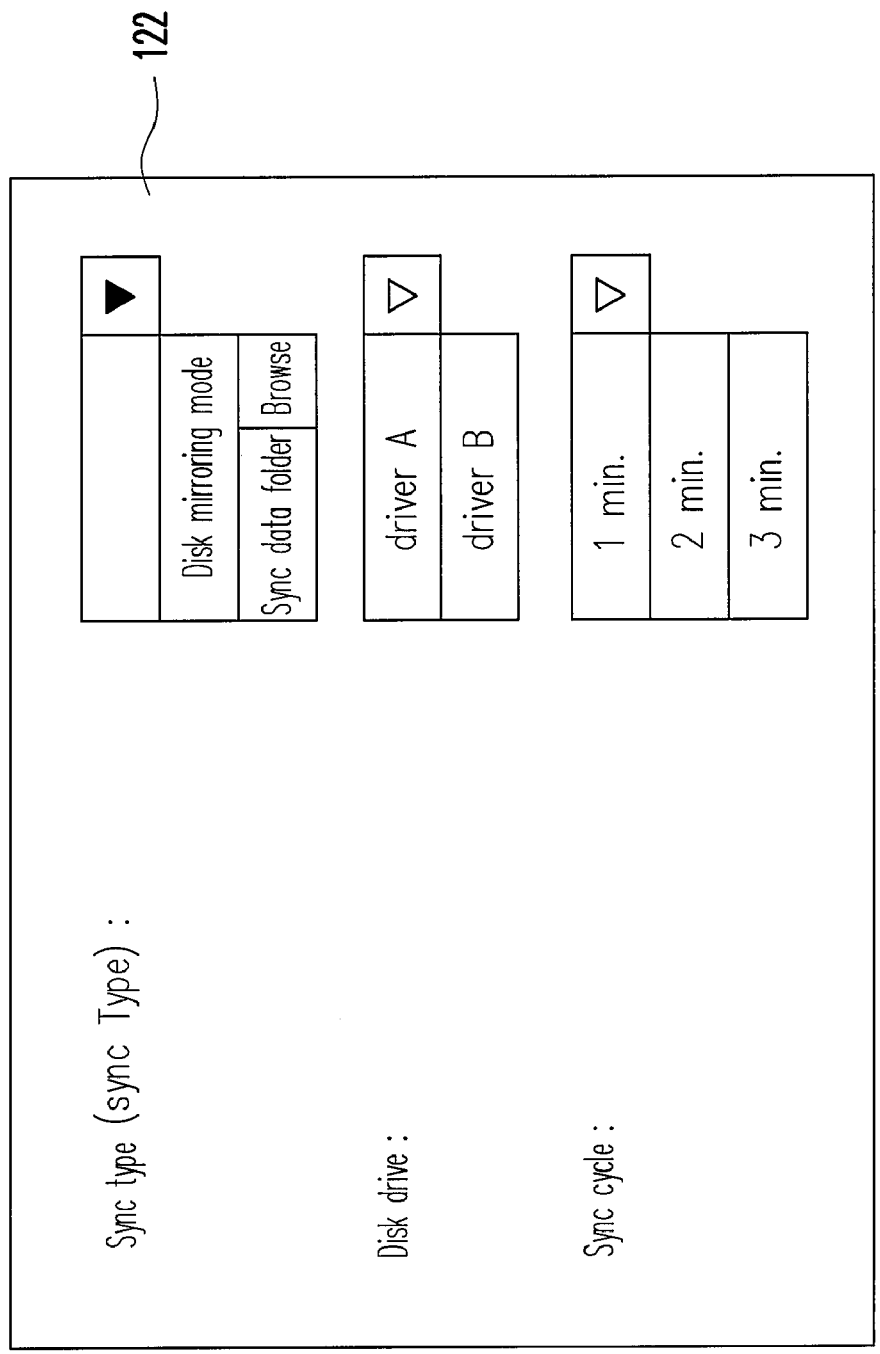

FIG. 5 schematically shows a diagram illustrating the setup function of the driver program.

Figure 6:
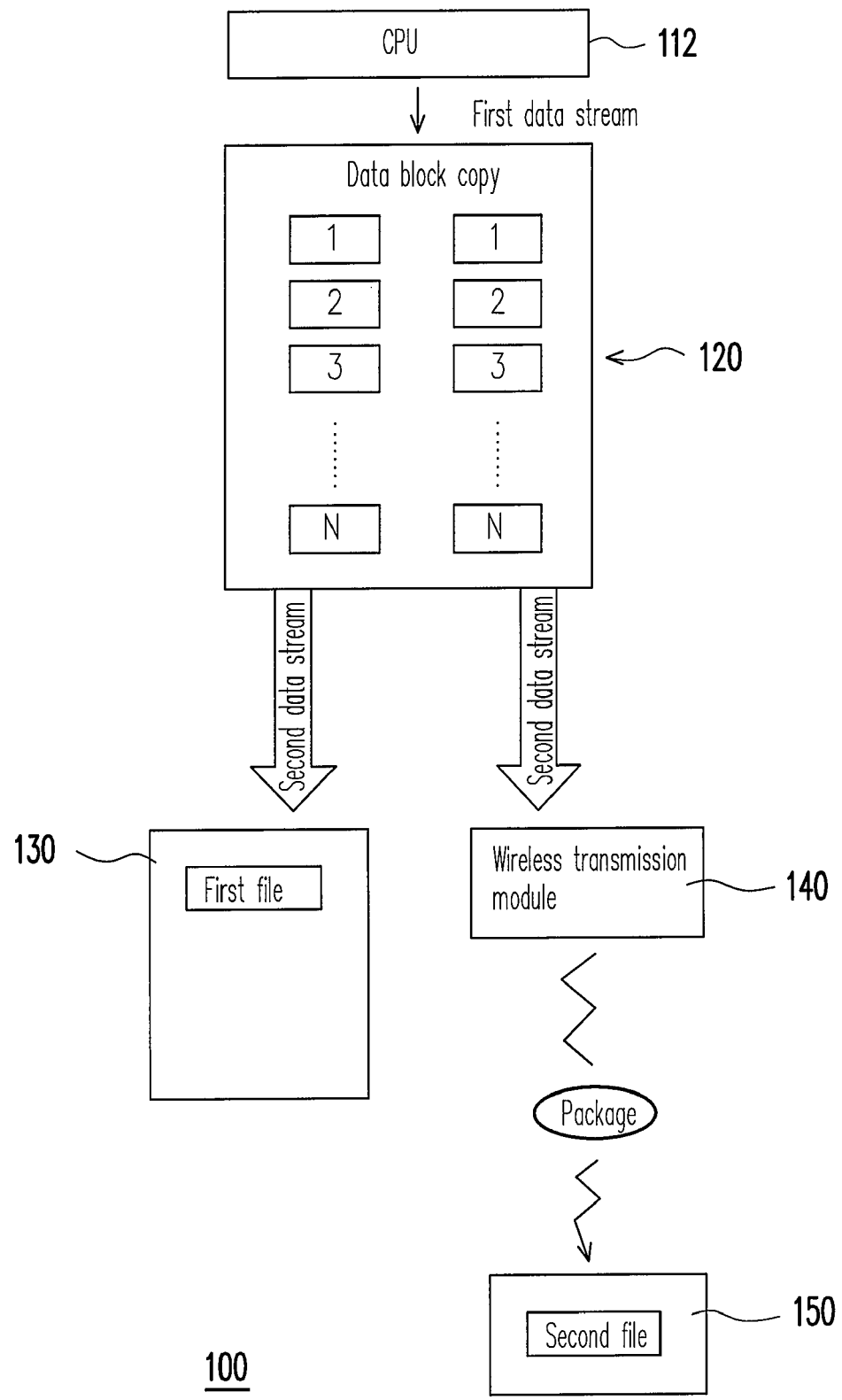

FIG. 6 schematically shows a diagram illustrating the data-sync chipset operation according to the present invention.

DESCRIPTION PREFERRED EMBODIMENTS

FIG. 3 schematically shows a block diagram of an electronic device with the automatic backup function according to a first embodiment of the present invention. The electronic device 100 comprises a main board 110, a data-sync chipset 120, a first storage unit 130, a wireless transmission module 140, and a second storage unit 150. The main board 110 mainly comprises a CPU 112, a memory, a south bridge/north bridge chipset, and a plurality of transmission interfaces or high speed buses (not shown) for providing the signal processing and operating voltage to the computer peripheral devices. In addition, the data-sync chipset 120 disposed on the main board 110 is electrically coupled to the CPU 112 through the transmission interface of the main board 110, so as to receive the data stream generated by the CPU 112 or other controllers. It is to be noted that when the data-sync chipset 120 receives the first data stream from the CPU 112, a second data stream is output from the data-sync chipset 120 to both the first and the second storage units 130 and 150 simultaneously, so as to accomplish the purpose of automatic backup.

As shown in FIG. 3, the first storage unit 130 is, for example, an internal hard drive disposed inside a case 160 and electrically coupled to a first terminal of the data-sync chipset 120, and the second storage unit 150 is, for example, disposed outside of the case 160. In addition, the wireless transmission module 140 is, for example, a WLAN (Wireless Local Area Network) module, a Bluetooth transmission module, or an infrared transmission module, which is disposed on the main board 110 and electrically coupled to a second terminal of the data-sync chipset 120. Both of the data-sync chipset 120 and the wireless transmission module 140 are controlled and driven by a driver program 122, such that the second data stream is stored in the first and second storage units 130 and 150, wherein the second data stream is stored in the first storage unit 130 as a first file F1, and another second data stream is stored in the second storage unit 150 as a second file F2 by means of wireless transmission after it is assembled into a packet. Here, the first file F1 is substantially equal to the second file F2. That is to say, both F1 and F2 share the same file name, same file content, and same file size. When a user opens an application program to edit the first file F1, if the first file F1 is modified and stored as a third file F3 which has the same file name as the first file F1, and the second file F2 has not been modified yet, the data-sync chipset 120 will determine that the second file F2 should be modified at the same time, and then the data-sync chipset 120 copies the third file F3 to the second storage unit 150 and overwrites the second file F2 therein, so as to accomplish the purpose of automatic backup. On the contrary, when the second file F2 in the second storage unit 150 is modified as a fifth file F5 (not shown), the data-sync chipset 120 copies the fifth file F5 to the first storage unit 130 and overwrites the third file F3 therein.

Moreover, the first storage unit 130 further comprises a fourth file F4. For example, the fourth file F4 is copied from a floppy disc or a USB device to the first storage unit 130. Meanwhile, the data-sync chipset 120 instructs the first storage unit 130 to copy the fourth file F4 to the second storage unit 150 by means of mapping through the wireless transmission module 140, so as to accomplish the purpose of automatic backup.

FIG. 4 schematically shows a block diagram of an electronic device with the automatic backup function according to a second embodiment of the present invention. As shown in FIG. 4 and FIG. 5 in the present embodiment, the first storage unit 130 has a sync data folder S1 storing the data and files which the user expects to backup. The data-sync chipset 120 writes the data into the sync data folder S1, and when the file in the sync data S1 is modified, the data-sync chipset 120 automatically reads all the data in the sync data folder S1 and simultaneously copies the data therein to the sync data folder S2 in the second storage unit 150 through the wireless transmission module 140, so as to accomplish the purpose of automatic backup.

FIG. 5 schematically shows a diagram illustrating the setup function of the driver program. The driver program 122 further comprises a function option which has a pull down menu for the purpose of selecting the sync type, the disc indicator, and the sync cycle. Here, the sync type is used to configure the automatic backup operation mode; namely, the disk mirroring mode and the sync data folder mode. The pull down menu of the sync cycle is used to configure the time for automatic backup. The second embodiment is exemplified herein for description, as shown in FIG. 4 and FIG. 5. When the sync data folder mode is selected by the user, the content of the first storage unit 130 can be furthered browsed, and a data folder in the first storage unit 130 is configured as the sync data folder S1. When the data in the sync data folder S1 is modified, the data-sync chipset 120 and the driver program 122 copy all data in the sync data folder S1 of the first storage unit 130 to the second storage unit 150 and overwrite the original data therein, so as to accomplish the purpose of automatic backup.

FIG. 6 schematically shows a diagram illustrating the data-sync chipset operation according to the present invention. In the first embodiment, the data-sync chipset 120 is, for example, embodied by a RAID controller, and the RAID controller may be configured to operate in the RAID 1 mode (i.e. the disk mirroring mode). Here, when the CPU 112 outputs a first data stream to the data-sync chipset 120, the data blocks 1N are automatically duplicated in two copies and the two copies are respectively written into the first storage unit 130 and the second storage unit 150. A second data stream is stored as a first file in the first storage unit 130, and another second data stream is assembled into a package by the wireless transmission module 140 and stored as a second file. In RAID 1 mode, the same data are stored in different hard drives. Accordingly, the same data can be maintained in two storage units 130 and 150 to avoid the data loss or damage.

In accordance with the method mentioned above, if the second storage unit 150 is a portable external hard drive supporting the wireless data transmission, a user can first backup the incomplete work file to the second storage unit 150 in the office, and then the data file can be read from the second storage unit 150 at home in order to revise the office work. Once the user goes to the office again, the second storage unit 150 can be connected to the main board 110 through the wireless transmission module 140; meanwhile, the data-sync chipset 120 can backup the modified file to the first storage unit 130 (i.e. the internal hard drive) for the purpose of data sync. Accordingly, in the electronic device 100 provided by the present invention, the driver program 122 determines whether the file is modified by a file modification time, and the driver program 122 copies the files in the sync data folder S1 during a predetermined period of time, such that the data security is improved.

In the method of transmitting the second data stream to the second storage unit 150 through the WLAN transmission mentioned above, the WLAN transmission method, for example, comprises an IEEE 802.11b or an IEEE 802.11g WLAN transmission whose transmission rate is about 54 Mbits/sec. If the first storage unit 130 is an internal hard drive, the transmission rate is about 150 MBytes/sec. To support the data sync process, if the transmission rate of the first storage unit 130 is much higher than the transmission rate of the second storage unit 150, the driver program 122 and the data-sync chipset 120 must change the transmission rate of the first storage unit 130 to the transmission rate of the second storage unit 150. In other words, the data sync process had better to be performed when both storage units have the same transmission rate.

In summary, since the data-sync chipset is used in the present invention, the modified first file (i.e. the third file) can be copied to the second storage unit by means of RAID 1 and overwrite the second file therein. Accordingly, same files can be saved in two different storage units so as to raise file-sharing capability and to facilitate its users. In addition, if a sync data folder is configured in the first storage unit, all of the files in the sync data folder can be simultaneously written into the second storage unit during a predetermined period of time by means of automatic data sync, such that the data loss or damage is avoided, and the data security is further improved.

Although the present invention has been described in terms of exemplary embodiments, it is not limited thereto. Rather, the appended claims should be constructed broadly to include other variants and embodiments of the invention which may be made by those skilled in the field of this art without departing from the scope and range of equivalents of the invention.

What is claimed is:

1. An electronic device with an automatic backup function to deal with at least a first data stream, comprising:

a main board;

a data-sync chipset disposed on the main board for receiving the first data stream, wherein the data-sync chipset outputs at least a second data stream;

a first storage unit electrically coupled to a first terminal of the data-sync chipset, wherein the second data stream is stored as a first file in the first storage unit;

a wireless transmission module disposed on the main board and electrically coupled to a second terminal of the data-sync chipset, wherein both of the data-sync chip and the wireless transmission module are controlled and driven by a driver program; and a second storage unit electrically coupled to the wireless transmission module by means of wireless transmission, the second data stream being stored in the second storage unit as a second file, and the first file being substantially equal to the second file, wherein the data-sync chipset copies a third file to the second storage unit and overwrites the second file therein when the first file is modified to the third file but the second file is not modified yet.

2. The electronic device with the automatic backup function of claim 1, wherein the first data stream is copied to the first storage unit and the second storage unit by means of mapping.

3. The electronic device with the automatic backup function of claim 1, wherein the data-sync chipset is a RAID controller, and the RAID controller is configured to operate in a RAID 1 mode (a disk mirroring mode).

4. The electronic device with the automatic backup function of claim 1, wherein the data-sync chipset and the driver program determine whether the first file is modified according to a file modification time.

5. The electronic device with the automatic backup function of claim 1, wherein the driver program further comprises at least a function option, and the function option defines a first data folder of the first storage unit as a sync data folder.

6. The electronic device with the automatic backup function of claim 5, wherein the data-sync chipset and the driver program copy the first data folder of the first storage unit to the second storage unit and overwrite the original data therein during a predetermined period of time.

7. The electronic device with the automatic backup function of claim 1, further comprising a case, wherein the first storage unit is an internal hard drive fixed on the case, and the second storage unit disposed outside of the case is a portable external hard drive supporting the wireless data transmission.

8. The electronic device with the automatic backup function of claim 1, wherein the data-sync chipset copies a fifth file to the first storage file and overwrites the third file therein when the second file is modified to the fifth file and the third file is not modified yet.

9. The electronic device with the automatic backup function of claim 1, wherein the driver program and the data-sync chipset instruct a first transmission rate of the first storage unit to be equal to a second transmission rate of the second storage unit.

10. The electronic device with the automatic backup function of claim 1, wherein the wireless transmission method comprises an IEEE 802.11b or an IEEE 802.11g WLAN transmission.

11. The electronic device with the automatic backup function of claim 1, wherein the first data stream is provided by a CPU.

* * * * *